US009692690B2

(12) United States Patent
Joshi et al.

(10) Patent No.: US 9,692,690 B2
(45) Date of Patent: Jun. 27, 2017

(54) METHOD AND SYSTEM FOR PATH MONITORING IN A SOFTWARE-DEFINED NETWORKING (SDN) SYSTEM

(71) Applicant: Telefonaktiebolaget L M Ericsson (publ), Stockholm (SE)

(72) Inventors: Vinayak Joshi, Bangalore (IN); Ashvin Lakshmikantha, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 72 days.

(21) Appl. No.: 14/816,513

(22) Filed: Aug. 3, 2015

(65) Prior Publication Data
US 2017/0041209 A1    Feb. 9, 2017

(51) Int. Cl.
*H04L 12/721* (2013.01)
*H04L 12/715* (2013.01)
(Continued)

(52) U.S. Cl.
CPC .......... *H04L 45/38* (2013.01); *H04L 43/0811* (2013.01); *H04L 43/10* (2013.01); *H04L 45/64* (2013.01); *H04L 45/745* (2013.01)

(58) Field of Classification Search
CPC ..... H04L 45/38; H04L 45/42; H04L 12/4633; H04L 41/042; H04L 45/64; H04L 45/745; H04L 45/50; H04L 43/106
See application file for complete search history.

(56) References Cited

U.S. PATENT DOCUMENTS 5,634,004 A    5/1997  Gopinath et al.
7,760,636 B1 *  7/2010  Cheriton ............... H04L 1/1874
                                              370/230
(Continued)

FOREIGN PATENT DOCUMENTS

EP    2747346 A1    6/2014
WO   2009/118602 A2   10/2009
(Continued)

OTHER PUBLICATIONS

Mats Bjorkman, et al., "Bandwidth Available in Real Time measurement Applications", Ericsson AB, SICS AB, 2006, 6 pages.
(Continued)

*Primary Examiner* — Noel Beharry
*Assistant Examiner* — Nicole King
(74) *Attorney, Agent, or Firm* — Nicholson De Vos Webster & Elliott LLP

(57) ABSTRACT

A method for path monitoring is disclosed. The method includes receiving, at the network device, a packet from a SDN controller to monitor a path for a service between the network device and another network device. The method includes sending the packet to at least a first and a second port, where a first instance of the packet is transmitted to the first port to the other network device to monitor the path, and a second instance is transmitted to the second port that loops back the second instance to the network device at a transmission interval so that the packet is sent to the first port repetitively at the transmission interval. The method also includes determining whether or not the packet is received from the other network device within a timeout interval and discarding the packet upon determination that the packet is received within the timeout interval.

20 Claims, 12 Drawing Sheets

(51) Int. Cl.
*H04L 12/741* (2013.01)
*H04L 12/26* (2006.01)

(56) References Cited

U.S. PATENT DOCUMENTS

| | | | |
|---|---|---|---|
| 7,957,295 | B2 | 6/2011 | Varma et al. |
| 9,203,763 | B2 | 12/2015 | Anand et al. |
| 2008/0002594 | A1 | 1/2008 | Fosberg et al. |
| 2010/0296396 | A1 | 11/2010 | Brolin |
| 2010/0329250 | A1 | 12/2010 | Olesinski et al. |
| 2011/0222431 | A1 | 9/2011 | Oue et al. |
| 2012/0014396 | A1 | 1/2012 | Bae |
| 2012/0128000 | A1 | 5/2012 | Baillargeon et al. |
| 2013/0230060 | A1 | 9/2013 | Bernhard et al. |
| 2014/0169166 | A1 | 6/2014 | Anand et al. |
| 2014/0310390 | A1 | 10/2014 | Sorenson, III et al. |
| 2015/0078386 | A1* | 3/2015 | Jackson .............. H04L 45/7453 370/392 |
| 2015/0249587 | A1* | 9/2015 | Kozat .................... H04L 43/10 370/222 |
| 2016/0080243 | A1 | 3/2016 | Kodama et al. |
| 2016/0218917 | A1 | 7/2016 | Zhang et al. |
| 2016/0226742 | A1* | 8/2016 | Apathotharanan ..... H04L 43/12 |
| 2016/0285750 | A1* | 9/2016 | Saquib ................ H04L 41/0677 |

FOREIGN PATENT DOCUMENTS

| | | |
|---|---|---|
| WO | 2014/046875 A1 | 3/2014 |
| WO | 2014/139564 A1 | 9/2014 |

OTHER PUBLICATIONS

K. Hedayat, et al., "A Two-Way Active Measurement Protocol (TWAMP)", Network Working Group, RFC 5357, Oct. 2008, 26 pages.
A. Morton, et al., "Two-Way Active Measurement Protocol (TWAMP) Reflect Octets and Symmetrical Size Features", Internet Engineering Task Force (IETF), RFC 6038, Oct. 2010, 18 pages.
Nick McKeown, "Software-defined Networking," Infocom, Apr. 2009, 64 Pages.
D. Katz et al., "Bidirectional Forwarding Detection (BFD)," Internet Engineering Task Force, Request for Comments: 5880, Jun. 2010, pp. 1-49.
D. Katz et al., "Bidirectional Forwarding Detection (BFD) for IPv4 and IPv6 (Single Hop)," Internet Engineering Task Force, Request for Comments: 5881, Jun. 2010, pp. 1-7.
D. Katz et al., "Generic Application of Bidirectional Forwarding Detection (BFD)," Internet Engineering Task Force, Request for Comments: 5882, Jun. 2010, pp. 1-17.
D. Katz et al., "Bidirectional Forwarding Detection (BFD) for Multihop Paths," Internet Engineering Task Force, Request for Comments: 5883, Jun. 2010, pp. 1-6.
"Ethernet ring protection switching," International Telecommunication Union, ITU-T, G.8032/Y.1344, Feb. 2012, 104 pages.
"OpenFlow Switch Specification Version 1.3.5 (Protocol version 0x04)", Open Networking Foundation, Mar. 26, 2015, pp. 1-177.
Prashant Anand et al., "High-Precision Packet Train Generation", U.S. Appl. No. 14/628,121, filed Feb. 20, 2015, pp. 1-50.
Satoshi Narikawa, "G.8032 : Ethernet Ring protection characteristics, architectures and the Ring APS protocol", Joint ITU-T/IEEE Workshop on The Future of Ethernet Transport, IEEE, May 28, 2010, pp. 1-23.
J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
T. Socolofsky, et al., "A TCP/IP Tutorial," Jan. 1991, 28 pages, Network Working Group, Request for Comments: 1180.

S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
B. Fenner, et al., "Management Information Base for the User Datagram Protocol (UDP)," Jun. 2005, 19 pages, Network Working Group, Request for Comments: 4113, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Babiarz, et al., "Configuration Guidelines for DiffServ Service Classes," Aug. 2006, 57 pages, Network Working Group, Request for Comments: 4594, The Internet Society.
K. Kompella, et al., "Virtual Private LAN Service (VPLS) Using BGP for Auto-Discovery and Signaling," Jan. 2007, 28 pages, Network Working Group, Request for Comments: 4761, The IETF Trust.
M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.

(56) References Cited

OTHER PUBLICATIONS

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

* cited by examiner

| Flow Table Entry 201 | Match Fields 202 | Priority 203 | Counters 204 | Instructions 206 | Timeouts 207 | Cookie 208 |

| Group Table Entry 211 | Group Identifier 212 | Group Type 214 | Counters 216 | Action Buckets 218 |

Table 0 302

| In Port | Action |
|---|---|
| Controller | GoTo Group Table |
| Loopback Port | GoTo Group Table |

Group Table 312

| Match Field | Action Bucket |
|---|---|
| L3 Protocol = IP, Source IP = Local Tunnel IP, Destination IP = Remote Tunnel IP, L4 Protocol = UDP, UDP Port = 12345 | Forward on to Tunnel Port |
| | Forward on Loopback Port |

Source Network Element Forwarding Tables 362

FIG. 3A

Table 1 304

| Match Field | Priority | Action | Timeouts |
|---|---|---|---|
| L3 Protocol = IP, Source IP = Local Tunnel IP, Destination IP = Remote Tunnel IP, L4 Protocol = UDP, UDP Port = 12345 | 0 | Drop the packet | Failure Detection Interval |
| Same as above | 1 | Notify Controller | None |

Destination Network Element Forwarding Tables 364

FIG. 3B

Table 0 602

| In Port | Action |
|---|---|
| Controller | GoTo Group Table |
| Loopback Port | GoTo Group Table |
| Tunnel Port | GoTo Table 1 |

Group Table 612

| Match Field | Action Bucket |
|---|---|
| L3 Protocol = IP, Source IP = Local Tunnel IP, Destination IP = Remote Tunnel IP, L4 Protocol = UDP, UDP Port = 12345 | Forward on to Tunnel Port |
| | Forward on Loopback Port |

Table 1 604

| Match Field | Priority | Action | Timeouts |
|---|---|---|---|
| L3 Protocol = IP, Source IP = Local Tunnel IP, Destination IP = Remote Tunnel IP, L4 Protocol = UDP, UDP Port = 12345 | 0 | Drop the packet | Failure Detection Interval |
| Same as above | 1 | Notify Controller | None |

Source Network Element Forwarding Tables 662

FIG. 6A

Table 0 652

| Match Field | Action |
|---|---|
| L3 Protocol = IP, Source IP = Local Tunnel IP, Destination IP = Remote Tunnel IP, L4 Protocol = UDP, UDP Port = 12345 | Reflect back to the tunnel Port |

Destination Network Element Forwarding Tables 664

FIG. 6B

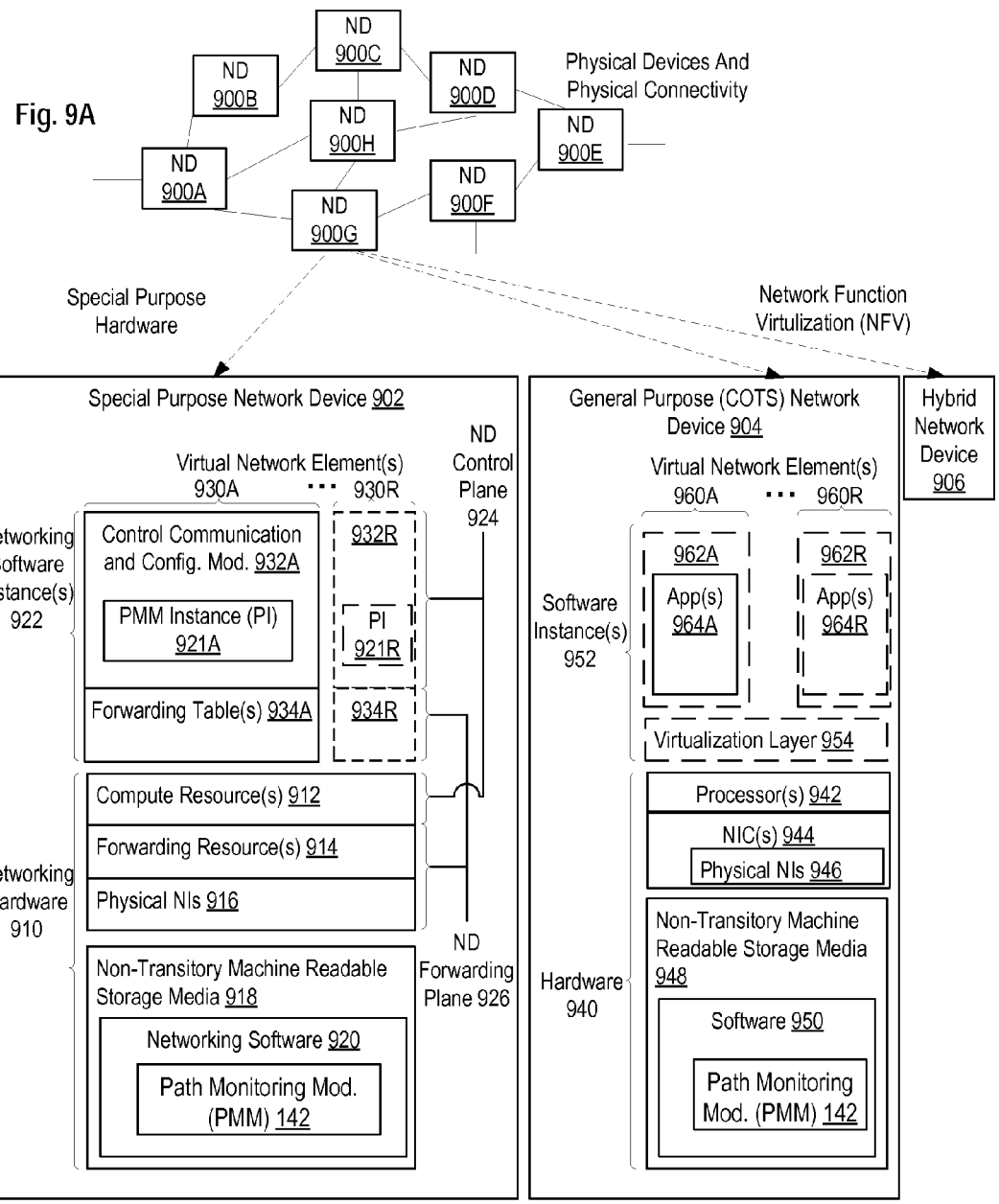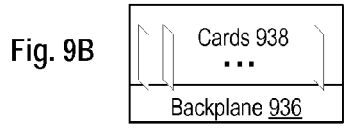

METHOD AND SYSTEM FOR PATH MONITORING IN A SOFTWARE-DEFINED NETWORKING (SDN) SYSTEM

FIELD OF INVENTION

The embodiments of the invention are related to the field of networking. More specifically, the embodiments of the invention relate to a method and system for path monitoring in a software-defined networking (SDN) system.

BACKGROUND

Path monitoring is important in networking. Path monitoring typically monitors a network for faults, and whenever faults do occur, network traffic is moved out of the faulty nodes/links to other normal nodes/links. The monitoring and mitigation ensures that a network work is highly available for sending data traffic even through some nodes/links are at fault. Bidirectional Forwarding Detection (BFD) is one approach for detecting path faults in traditional networks. With BFD, paths (e.g., pseudo-wire, PW) between nodes are monitored. The protocol periodically exchanges keep-alive packets between peers. So long as a node receives these packets from its peer, the connection is assumed to be up. If a node fails to receive a certain number of packets within a specific period (say 3 packets within 10 milliseconds), then the node will assume that the connectivity to the peer is lost on that path and will begin restoration action.

Software-defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

With both of SDN and path monitor being preeminent in networking, it is desirable to be able to implement path monitoring in a SDN system.

SUMMARY

Methods for path monitoring are disclosed. In one embodiment, the method is implemented in a network device coupled to a software-defined networking (SDN) system, where the SDN system contains a set of network devices and a SDN controller managing the set of network devices. The method includes receiving, at the network device, a packet from the SDN controller to monitor a path for a service between the network device and another network device. The method further includes sending the packet to at least a first and a second port, where a first instance of the packet is transmitted to the first port to the other network device to monitor the path, and where a second instance of the packet is transmitted to the second port that loops back the second instance of the packet to the network device at a transmission interval so that the packet is sent to the first port repetitively at the transmission interval. The method also includes determining whether or not the packet is received from the other network device within a timeout interval and discarding the packet upon determination that the packet is received within the timeout interval.

Network devices for path monitoring are disclosed. In one embodiment, the network device is coupled to a software-defined networking (SDN) system, where the SDN system contains a plurality of network devices and a SDN controller managing the plurality of network devices. The network device comprises a processor and a memory coupled to the processor, the memory containing instructions executable by the processor. The network device receives a packet from the SDN controller to monitor a path for a service between the network device and another network device; and sends the packet to at least a first and a second port, where a first instance of the packet is transmitted to the first port to the other network device to monitor the path, and where a second instance of the packet is transmitted to the second port that loops back the second instance of the packet to the network device at a transmission interval so that the packet is sent to the first port repetitively at the transmission interval. The network device further determines whether or not the packet is received from the other network device within a timeout interval and discard the packet upon determination that the packet is received within the timeout interval.

Non-transitory machine-readable storage media for path monitoring are disclosed. In one embodiment, a non-transitory machine-readable storage medium having instructions stored therein, which when executed by a processor, cause the processor to perform operations in a network device coupled to a software-defined networking (SDN) system, where the SDN system contains a set of network devices and a SDN controller managing the set of network devices. The operations include receiving, at the network device, a packet from the SDN controller to monitor a path for a service between the network device and another network device; sending the packet to at least a first and a second port, where a first instance of the packet is transmitted to the first port to the other network device to monitor the path, and where a second instance of the packet is transmitted to the second port that loops back the second instance of the packet to the network device at a transmission interval so that the packet is sent to the first port repetitively at the transmission interval. The operations further include determining whether or not the packet is received from the other network device within a timeout interval and discarding the packet upon determination that the packet is received within the timeout interval.

Embodiments of the disclosed technique aim at implementing path monitoring efficiently at a SDN system so that a SDN controller is not involved in real-time, repetitive operations in each path monitoring session. Instead, the SDN controller initiates path monitoring sessions and intervenes when one session encounters issues.

BRIEF DESCRIPTION OF THE DRAWINGS

The invention may best be understood by referring to the following description and accompanying drawings that are used to illustrate embodiments of the invention. In the drawings:

FIG. 3A illustrates forwarding table implementation for unidirectional path monitoring at a source network element according to one embodiment of the invention.

FIG. 3B illustrates forwarding table implementation for unidirectional path monitoring at a destination network element according to one embodiment of the invention.

FIG. 6A illustrates forwarding table implementation for bidirectional path monitoring at a source network element according to one embodiment of the invention.

FIG. 6B illustrates forwarding table implementation for bidirectional path monitoring at a destination network element according to one embodiment of the invention.

FIG. 9A illustrates connectivity between network devices (NDs) within an exemplary network, as well as three exemplary implementations of the NDs, according to some embodiments of the invention.

FIG. 9B illustrates an exemplary way to implement a special-purpose network device according to some embodiments of the invention.

DETAILED DESCRIPTION

Figure 1A:
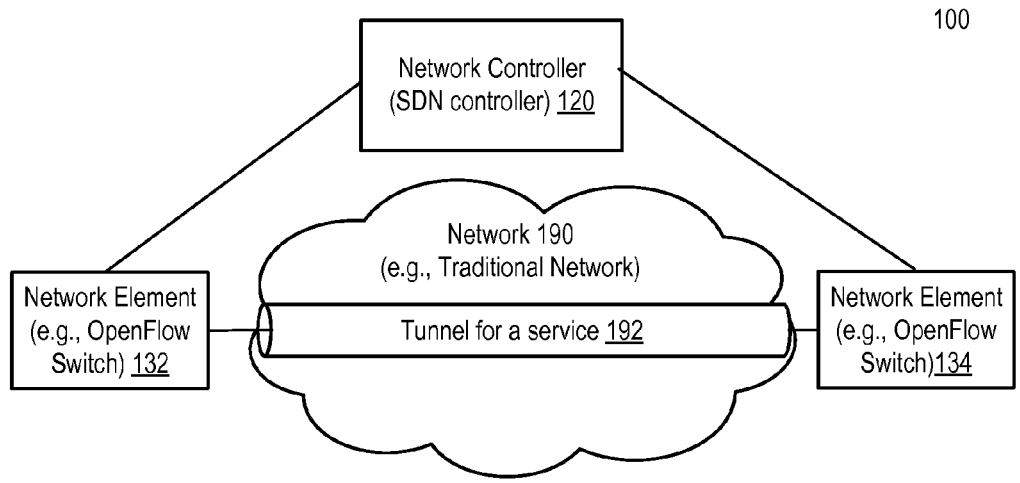
FIG. 1A illustrates an architecture of a SDN system implementing path monitoring according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). A network element, as explained in more details herein below, may be implemented in one or more network devices.

Challenges of Path Monitoring in a SDN System

One advantage of path monitoring scheme such as Bidirectional Forwarding Detection (BFD) is that the operations do not depend on having control of the entire network to monitor a path. An operator may monitor connectivity between two nodes under its control by exchanging BFD messages. The path taken by the messages can be under the control of a different entity with no explicit support for BFD or other path monitoring scheme. As long as the entity owning the network allows for the messages to be exchanged between the two nodes, BFD can be used to monitor path connectivity.

For carrier-grade networks, the timing of fault detection and mitigation is important for a path monitoring scheme. For avoiding a large amount of traffic loss, a typical expectation for fault detection and mitigation is that the service disruption to an end-user service is to be less than 50 milliseconds (ms). In order to achieve the <50 ms service disruption, a network device vendor typically reserves 10 ms for failure detection and 40 ms for mitigation (also often referred to as service restoration).

Failure detection typically includes two main parts: (1) heartbeat packet generation: Generating closely spaced heartbeat packets; and (2) forwarding state detection: Detecting the arrivals and non-arrivals of the heartbeat packets. The non-arrival detection helps the determination of a forwarding path breakage and the arrival detection helps the determination of normalcy or restoration of a forwarding path. It is to be noted that heartbeat packets for path monitoring is the same as path monitoring packet, and the specification uses them interchangeably.

In the transition from traditional networks to SDN networks, current network deployment is typically hybrid and uses both traditional and SDN network elements/devices. One such deployment is overlay networking. In this model, SDN compliant network elements (e.g., Openflow (OF) switches) communicate using overlay tunnels over traditional switches/routers. Such approaches are used in layer 3 service chaining, virtual home gateway (vHGW), virtual enterprise gateway (vEGW) solutions. The overlay tunnels are typically implemented using technologies such as virtual extensible LAN (vXLAN), generic routing encapsulation (GRE), and/or multiprotocol label switching (MPLS).

In this kind of overlay solution, the entire network is not in compliance with SDN standards, and path monitoring typically involves tunnel monitoring. The tunnel monitoring also requires the heartbeat packet generation and forwarding state detection as discussed herein above. Additionally, it is desirable for the path/tunnel monitoring to use standard SDN south bound protocols such as OpenFlow to implement the required heartbeat packet generation and forwarding state detection.

One way to implement the failure detection is to lean heavily on a network controller (also referred to as a SDN controller) of a SDN system as the network controller coordinates management of the SDN system. The network controller may be configured to generate the closely spaced heartbeat packets, and the network controller then inserts the heartbeat packets through messages to the network elements of the SDN system (e.g., switches of the SDN system) at a periodic interval. At the receiving end of the heartbeat packets, the receiving network element forwards the packets to the network controller. The network controller then examines the heartbeat packets and determines whether the monitored path is normal or faulty.

In this approach, the network controller is in the middle of a real-time network monitoring function. The network controller is responsible for the heartbeat packet generation and detection. Given the number of network elements that a network controller may manage, it is difficult to achieve high performance and scalability. For example, in a SDN network with N number of network elements, using tunneling, there will be N×(N−1) tunnels between the network elements. Since the network controller is actively involved in path monitoring of each tunnel, the network controller will be overwhelmed with path monitoring messages and will not have computing resources to carry out other activities. For example, for a SDN network with 500 OpenFlow (OF) switches, the network controller needs to monitor messages for around 250,000 tunnels. Additionally, for detecting failure within 10 ms, a monitoring packet typically is sent once every 2~3 ms. With a 2 ms interval and each monitoring packet contains 64 bytes, the bandwidth taken for a single tunnel would be 256 kbps. If all the path monitoring packets are generated by the network controller, the total bandwidth on the network controller for monitoring the 250,000 channels would be 64 Gbps. Additionally, the network controller centric approach may cause latency that makes the path monitoring to slow. In the approach, a monitoring packet follows the path of: a network controller→Network element 1→Network element 2→the network controller. The two hops (the network controller→Network element 1 and Network element 2→the network controller) contribute to the major portion of the latency as these hops lie on the control path (typically slower path) of the network, and the 10 ms detection time is even harder to achieve. For all these reasons, it is desirable to implement a network element centric path monitoring.

For a network element centric path monitoring, one approach is to enable a network element to send proprietary packets outside of the SDN standards such as the OpenFlow standards. The network element may also detect failure of arrival of the proprietary packets on its own and report to the network controller when a path fails or is restored. The drawback of the approach is that this approach may not be used in conjunction with other network elements in compatible with SDN standard, thus the solution has limited use.

Architectures for Implementing Path Monitoring

Given the challenges of implementing path monitoring with the network controller performing the majority of the operations, it is desirable to give the network elements managed by the network controller more active roles in implementing Ethernet OAM. FIG. 1A illustrates an architecture of a SDN system implementing path monitoring according to one embodiment of the invention.

SDN system 100 contains network controller 120, which manages a number of network elements such as network elements 132 and 134. The detailed operations of a network controller and network elements are discussed herein below in relation to FIGS. 9A-F. The network elements 132-134 may be implemented as OpenFlow switches in compliance with the OpenFlow standards, and they communicate through a network 190, which can be a traditional network that does not in compliance with SDN standard. The path to be monitored is a tunnel for a service at reference.

A tunnel may be set up in the network 190 through a network management system (e.g., through automation tools). The information about the tunnel may be provided to the network controller via the network controller's north bound interfaces. In one embodiment, an application runs on the application layer of the SDN system, and the application receives the tunnel configuration from the network management system and provides information to the network controller. Thus, the network controller has the information about the tunnel end points as well as tunnel identifiers (IDs). The tunnel IDs may be different entries in different protocols. For example, for vXLAN, the tunnel ID may be VNI (vXLAN network identifier), and for MPLS, the tunnel ID may be a label for the tunnel.

It is to be noted while the example in the figure illustrates monitoring a tunnel through a network, the path monitoring techniques disclosed herein are not so limited, and other types of paths can utilize these techniques too. For example, the path monitoring techniques disclosed herein may monitor a path comprising the network elements in compliance with SDN standards, such that the network 190 is not a traditional network but a SDN system. In that case, no tunnel is required to transmit traffic through the path, and the path monitoring may monitor the path of network elements and links in between, where the intermediate network elements on the path have the visibility of the packets on the path.

Figure 1B:
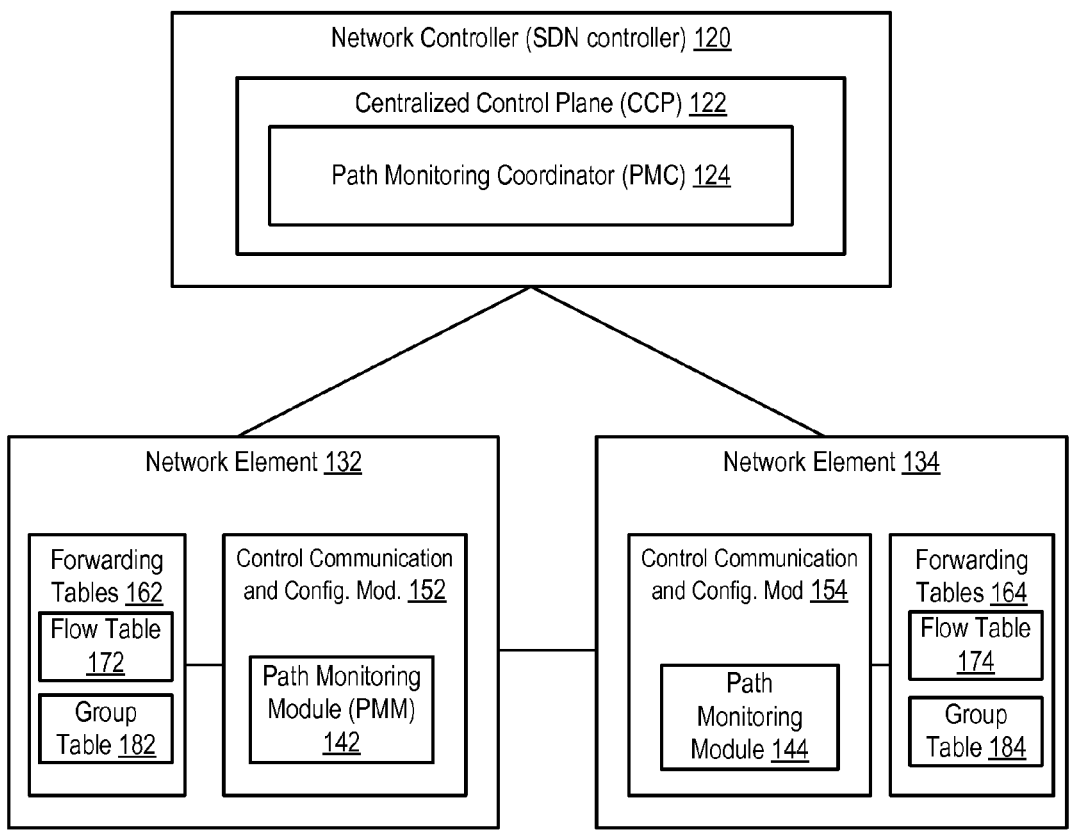
FIG. 1B illustrates functional blocks for path monitoring in a SDN system according to one embodiment of the invention.

FIG. 1B illustrates functional blocks for path monitoring in a SDN system according to one embodiment of the invention. The network controller 120 contains a centralized control plane 122, which includes a path monitoring coordinator (PMC) 124. A network element such as the network element 132 and 134 contains one or more forwarding tables such as forwarding tables 162 and 164. Each forwarding table includes one or more flow tables and group table—a flow table 172 and a group table 182 for the network element 132, and a flow table 174 and a group table 184 for the network element 134 respectively. Each network element also includes a control communication and configuration module such as control communication and configuration modules 152 and 154, each having a path monitoring module (PMM) such as PMMs 142 and 144 respectively.

Figures 1C, 2:
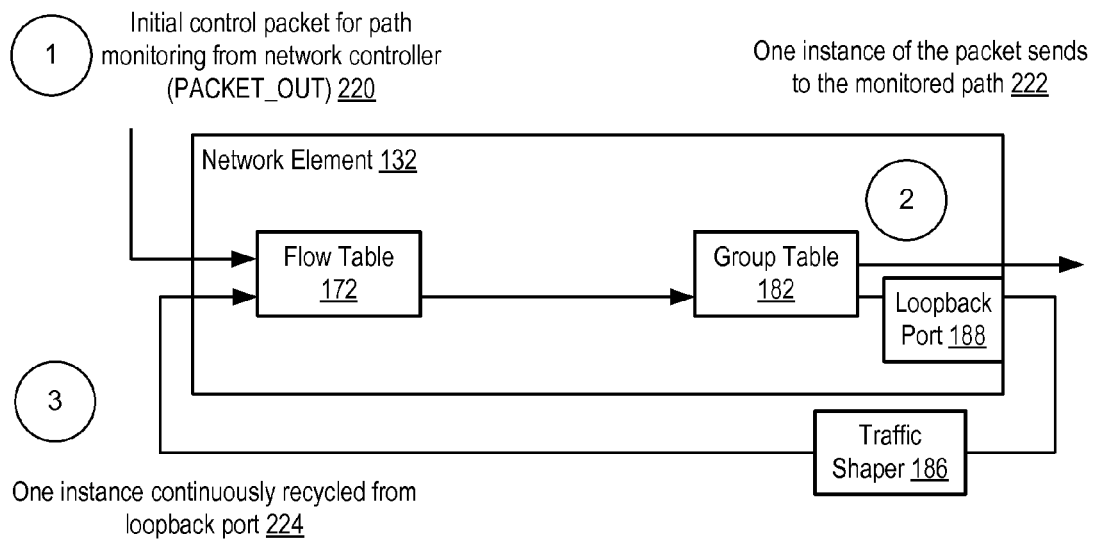
FIG. 1C illustrates an exemplary flow table entry 201 and an exemplary group table entry 211 according to one embodiment of the invention.
FIG. 2 illustrates operations in a sending network element for implementing path monitoring according to one embodiment of the invention.

Forwarding tables store routing information to direct routing of incoming packets by a network element. Forwarding tables may have a variety of types. For example, the OpenFlow standard defines flow table, group table, meter table, etc. Each table contains one or more table entries. FIG. 1C illustrates an exemplary flow table entry 201 and an exemplary group table entry 211 according to one embodiment of the invention.

Flow table entry 201 contains:
  Match fields 202: To match against packets. These comprise the ingress port and packet headers, and optionally metadata specified by a previous table.
  Priority 203: Matching precedence of a flow entry.
  Counters 204: Updated when packets are matched.
  Instructions 206: To modify the action set or pipeline processing.
  Timeouts 207: Maximum amount of time or idle time before flow is expired by the network element.
  Cookie 208: Opaque data value chosen by the network controller. May be used by the controller to filter flow statistics, flow modification, and flow deletion.

A flow table entry may be identified by its match fields and priority; the match fields and priority taken together identify a unique flow entry in the flow table. A flow table entry generally allows the packets of a matching flow to be dropped or forwarded to one port. That is, a flow table entry generally allows a network element to dispose a packet to one port. For path monitoring, only some flow table entries may be needed, and these flow table entries (1) are to be associated with corresponding end points of paths (associated with monitored services), and (2) direct packets for further process at a group table.

The group table entry 211 contains:
  Group identifier 212: A numeric number (e.g., a 32 bit unsigned integer) uniquely identifying a group.
  Group type 214: To determine group semantics.
  Counters 216: Updated when packets are processed by a group.
  Action buckets 218: An ordered list of action buckets, where each action bucket contains a set of actions to execute and associated parameters.

A group table may be identified by a group identifier. A group table entry generally allows the packets of a matching flow to be forwarded to: a random port on a group of ports (for load-balancing), a first live port on a group of ports (for failover), and all ports on a group of ports (for multicasting). Thus, a group table entry allows a network element to dispose a packet to multiple ports. As discussed herein below, the property of the group table entry makes it feasible to engage network elements to play a more active role in implementing Ethernet OAM functions.

Packet Recirculation in Source Network Element for Path Monitoring

For monitoring a path, a network element at one end point of the path needs to send out a path monitoring packet (also referred to a heartbeat packet here), and that network element may be referred to as the source network element. The network element at the other end point of the path that receives the packet may be referred to as the destination network element. One challenge for the source network element is that the source network element needs to generate closely spaced heartbeat packets (e.g., every 3.3 ms).

FIG. 2 illustrates operations in a sending network element for implementing path monitoring according to one embodiment of the invention. Network element 132 is the same as the network element 132 of FIG. 1B, and the same or similar references indicate elements or components having the same or similar functionalities. Certain aspects of FIG. 1B have been omitted from FIG. 2 in order to avoid obscuring other aspects of FIG. 2. Cycles 1 to 3 illustrate the order in which the packets are processed according to one embodiment of the invention.

At cycle 1, the network controller 120 sends an initial control packet for path monitoring at reference 220. The packet is referred to as a "control" packet as it is sent from the network controller. The initial control packet takes the PACKET_OUT format of the OpenFlow standards in one embodiment. The control packet may be sent from the path monitoring coordinator (PMC) 124 of the network controller 120 as illustrated in FIG. 1B.

For tunnel monitoring, the initial control packet may use the format of one of the standard packets such as the format complies with Link Layer Discovery Protocol (LLDP), where the packet carrying LLDP data units (LLDPDUs) or an IP ping. The initial control packet may share a flow identifier with the one or more data traffic flows (e.g., carrying user traffic from the source network element to the destination network element) in the monitored tunnel, as the control packet is supposed to take the exactly same path as the traffic flows. For example, the control packet may contain a value of a differentiated service (often referred to as Differentiated service or DiffServ, which uses a differentiated services code point (DSCP) in a packet header) for packet classification, where the value of the differentiated service equals to the one for the monitored tunnel (when traffic flows on the monitored path share the same differentiated service value). When not all the traffic flows in the tunnel contain the same differentiated value, separated control packets may be sent from the network controller 120 for each of the different differentiated values in the tunnel.

The initial control packet as the path monitoring packet needs to be differentiated from packets of the data traffic flows on the same path. For tunnel monitoring, the control packet may be destined to a tunnel end point with a unique port number (e.g., a UDP port number) different from the ones for the data traffic flows. The unique port number may be derived from the tunnel ID so that the source network element and the network controller may be synchronized when either the network element or the network controller restarts. In one embodiment, the control packet may contains an Operation, Administration, and Management (OAM) message such as continuity check messages (CCMs, sometimes referred to as CCM/CFM messages, CFM being short for connectivity fault management) CCM/CFM message for a L2 service.

In one embodiment, the initial control packet is sent to the flow table 172, which determines that the initial control packet is from the network controller and for path monitoring of a particular path (e.g., a tunnel) by matching a flow table entry. The packet is then forwarded to the group table 182 for further processing. In an alternative embodiment, the initial control packet may be sent directly to the group table 182, where the control packet matches a group table entry for path monitoring of the particular path.

At cycle 2, when the initial control packet matches a group table entry for path monitoring of the particular path, the packet will be forwarded to a set of ports associated with the group table entry. One instance of the packet is to be forwarded to a loopback port 188; and another is to be forwarded toward the destination network element for path monitoring of the particular path (e.g., through a tunnel end point of the source network element) at reference 222.

The loopback port 188 is to loop back a packet so the packet is accessible by the flow table 172 and the loopback port may be implemented in several ways:

The loopback may be implemented as an external loopback across two physical ports, in which case the network element 132 does not need to change its operations in accommodation of the loopback—the physically wired loopback can be transparent to the network element 132 in making forwarding decisions.

The loopback may be implemented as an internal loopback either through a special port or one of the physical ports set in internal loopback mode.

The loopback may be implemented through a software extension at the network element, where a local port is emulated as a loopback port. In this embodiment, the packet is given a special encapsulation, so that the network element detects that this is a loopback packet and hence will be inserted back to the packet process pipeline starting at the flow table 172. In addition, the packet may be delayed a period, so it will be inserted back to the pipeline at the flow table 172 after a recycling time interval.

When the loopback is accomplished through a software extension, the packet may be delayed using the software extension, and no additional delay is needed to make the packet be looped back at the recycling time interval. Otherwise, a traffic shaper 186 may be utilized to delay the packet prior to making it accessible to the flow table 172. The traffic shaper 186 may be created as a delay element and will be configured based on the recycling time interval of the packet. The traffic shaper 186 may be implemented in several ways:

The traffic shaper may be attached to the queue associated with the loopback port. Delay of the traffic shaper may be based on the implementation of the loopback port. That is, the protocol for processing packets in a network element (e.g., OpenFlow specification) needs no change.

The traffic shaper may be configured through the protocol for processing packets in a network element of a SDN system. For example, a traffic shaper configuration message may be sent from the network controller to configure the delay for a particular loopback port.

The traffic shaper may be configured using an existing protocol for processing packets in a network element of a SDN system. For example, in OpenFlow Switch Specification 1.3.4, Section 7.2.2, an OpenFlow (OF) switch (i.e., a network element of a SDN system) has a queue, and the queue may be configured with a maximum-rate and a minimum-rate. One may configure this queue using standard OpenFlow message of queue configuration setting maximum-rate=minimum-rate. This rate can be selected as the required interval between two heartbeat packets. According to the Specification, the queue length may be configured in bytes, so that the network element may be configured with adequate buffering for the queue and hence the recycled packet will always find the place in the queue to get admitted and wait for the time since it gets scheduled as per allocated bandwidth for the queue. In this embodiment, the queue works like a delay element and may not need any change of the existing protocol.

The packet goes through the loopback port 188 and the traffic shaper 186 and reaches the flow table 172. In FIG. 2, the traffic shaper 186 is illustrated outside of network element 132 and after the loopback port 188. However, the traffic shaper 186 may be implemented within the network element 132 and prior to the loopback port 188 in one embodiment. Also, as discussed herein above, the traffic shaper 186 may be unnecessary in some embodiments.

At cycle 3, the instance of the packet then cycles through the flow table 172, the group table 182, the loopback port 188, and the traffic shaper 186 (the combination of which may be referred to as a packet recirculation path), while the packet is sent to other ports to reach the destination network element of the monitored path. The subsequent continuously recycled packets for path monitoring from loopback may arrive at the flow table 172 at a predetermined interval (e.g., 3.3 milliseconds as discussed herein above) at reference 224.

The predetermined interval may be set through timeouts 207 in FIG. 1C.

The packets may be looped back continuously without the involvement of network controller 120 after sending the initial control packet, from which the loopback operations starts. With the continuous loopback, the timeout value associated with the packet (set through the timeouts 207) will not time out as its timeout value is reset every time the packet gets processed through the flow table. In that case, the recirculation is deemed to be operating normally. If the loopback path fails or otherwise does not work properly, the packet will not be looped back to the flow table within the timeout period as specified in the timeouts, in which case the source network element may send a notification to the network controller, so that the network controller may intervene and fix the failure.

In one embodiment, the packet continues the cycling at network element 132 until the network controller notifies the source network element to terminate the packet recirculation. Additionally, the recirculation may be terminated through setting timeouts 207. The timeout value may be set to be a predetermined value, for example, around the time taking three path monitoring packets to be transmitted at the source network element 132. For example, if the source network element is supposed to transmit the path monitoring packet every 3.3 ms, the timeout value may be set to 10 ms, and if no path monitoring packet is received at the forwarding table after waiting 10 ms, the group table entry is removed, and the removal is notified to the network controller 120, which may resource the problem at the source network element 132.

The packet recirculation removes the network controller from the task of regularly generating closely spaced heartbeat packets, thus this approach removes the network controller from the most computing resource intensive task in path monitoring, which makes the network controller scalable in implementing path monitoring.

Unidirectional Path Monitoring

In one embodiment, the path monitoring may be implemented unidirectionally. In unidirectional path monitoring, the path monitoring is implemented to determine the health of a path from a source network element to a destination network element. When a packet goes through the unidirectional path within an expected time interval and without error, the unidirectional path is deemed healthy. In contrast, in bidirectional path monitoring, the path monitoring is implemented to determine the health of a path from a source network element to a destination network element and then back to the source network element. The same packet would need to be transmitted from the source network element and then back to the source network element within another expected time interval and without error for the bidirectional path to be deemed healthy.

FIG. 3A illustrates forwarding table implementation for unidirectional path monitoring at a source network element according to one embodiment of the invention. The source network element forwarding tables 362 includes a flow table 0 at reference 302 and a group table at reference 312. The source network element may be the network element 132 or 134 of FIG. 1A.

The path to be monitored in this example is a tunnel, which is an IP tunnel. The IP tunnel has a local tunnel IP address (which is an IP address of the source network element) and a remote tunnel IP address (which is an IP address of the destination network element), and the path monitoring is transmitted through a UDP port, which is numbered 12345.

A packet arrives at the flow table 0, and the source network element determines where the packet is forwarded to. The source network element verifies that the packet is for path monitoring of a particular tunnel, for example, checking its DSCP bits (e.g., using DSCP bits as a match field, not shown in table 0); and if the packet is from the network controller (thus it's an initial control packet) or from the loopback port (thus it's a recirculated packet), the packet is forwarded to the group table; if the packet does not come from either port but it's still for path monitoring of a path, the packet is processed in a different way (e.g., getting dropped).

At the group table at reference 312, the packet is checked and matched with the match fields for path monitoring of a specific tunnel, identified through L3 protocol (=IP), source IP address (=Local Tunnel IP), destination IP address (=Remote Tunnel IP), L4 protocol (UDP), and UDP port number (=12345). When the packet matches the match fields, the packet is processed according to the corresponding action bucket, where one instance of the packet is forwarded on to a tunnel port of the specific tunnel, and another instance is forwarded on to a loopback port, as discussed in relation to FIG. 2.

FIG. 3B illustrates forwarding table implementation for unidirectional path monitoring at a destination network element according to one embodiment of the invention. The destination network element forwarding tables 364 includes a flow table 1 at reference 304. The source network element may be the network element 132 or 134 of FIG. 1A.

A packet arrives at the flow table 1, and the destination network element determines where the packet is forwarded to. The flow table 1 contains two flow table entries that match to the same match field values, which are to match the values for specific path monitoring packets, thus the match field values in the table 1 at reference 304 is the same as the ones in the group table at reference 312. The two flow table entries have different priorities, and the higher priority one (priority=0 in this example) has a timeout value equal to a failure detection interval and its associated action is to drop the packet—the matching packets are received path monitoring packets, and once they are safely received within the failure detection interval, the path is deemed healthy, thus the packets can be dropped. Since the higher priority flow table entry has the timeout value, it will expire and gets deleted if there is no match during the failure detection interval. When the higher priority flow table entry expires, the lower priority flow table entry (priority=1 in this example) matches to the specific path monitoring packets, and its associated action is to notify the network controller—the matching packets are path monitoring packets received passed the expected failure detection interval and the network controller may determine the proper mitigation action. The late arrival of the path monitoring packet(s) may be due to path restoration, thus the network controller may reclassify the path as restored, for example.

It is to be noted that the two flow table entries matching to the same match field values may be created at different time. The lower priority flow table entry may be created earlier, so that the network controller is notified that path monitoring on the particular path cannot operate autonomously yet. The higher priority flow table entry may be created after the tunnel is set up and the path monitoring packet has sufficient time to arrive at the destination network element. For example, the higher priority flow table entry is created only 100 seconds after the network controller sends the initial control packet to the source network element, so that the source network element may have sufficient time to generate the path monitoring packets and transmit them through the monitored path. Additionally, the timeout value of the higher priority flow table may be set at a higher value (e.g., 100 seconds) at first, and once a path monitoring packet is successfully received at the destination network element, the timeout value is lower to the failure detection interval (e.g., 10 ms).

Also, it is to be noted that the values of timeout of the two flow table entries may vary in different embodiment. For example, the timeout value for the higher priority flow table entry may be shorter than the failure detection interval, which is typically several times over the packet transmission interval (e.g., the failure detection interval being 10 ms, and the path monitoring packets being transmitted every 3.3 ms). The shorter timeout value for the higher priority flow table entry makes the network controller be aware of the potential issue with the path earlier thus may take mitigation actions earlier too.

Figure 4A:
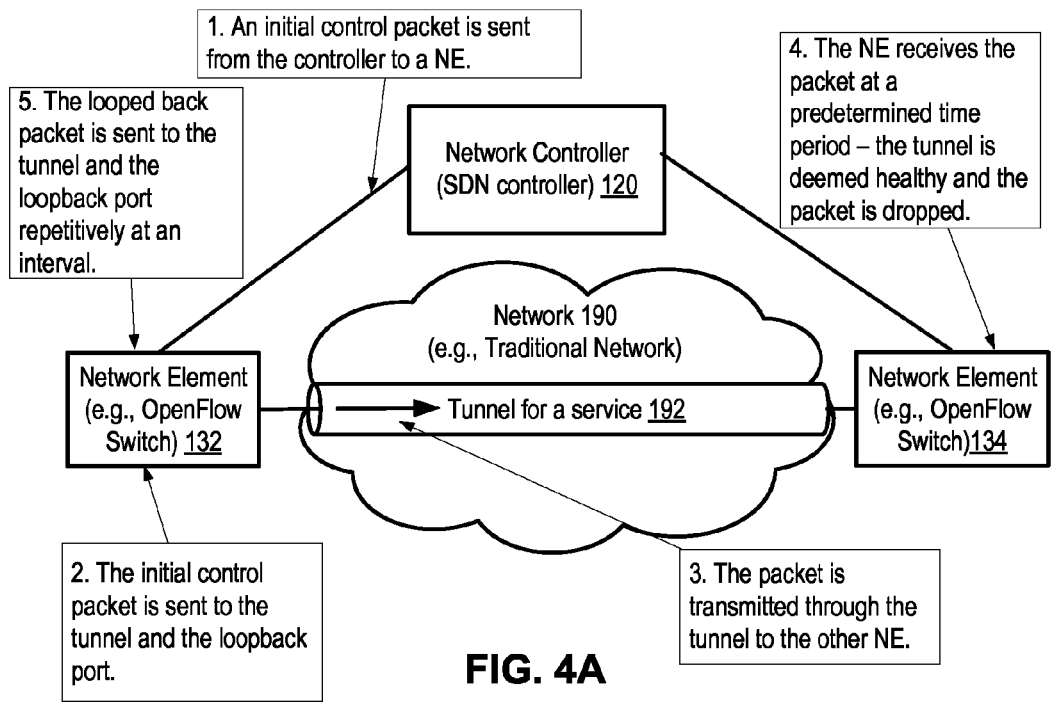
FIG. 4A illustrates unidirectional tunnel monitoring during normal operations according to one embodiment of the invention.

FIG. 4A illustrates unidirectional tunnel monitoring during normal operations according to one embodiment of the invention. FIG. 4A is similar to FIG. 1A, and the same or similar references indicate elements or components having the same or similar functionalities. Task boxes 1 to 5 illustrate the order in which operations are performed according to one embodiment of the invention.

At task box 1, the network controller 120 sends out an initial control packet to network element 132 (an OpenFlow switch in one embodiment), which is the source network element in this example. At task box 2, one instance of the initial control packet is sent to a tunnel to be monitored (here the tunnel for a service at reference 192), and another instance is sent to a loopback port of the source network element 132. At task box 3, the packet is transmitted through the tunnel to the destination network element 134. At destination network element 134, when the packet is received in a predetermined time period (e.g., the failure detection interval), the tunnel is then deemed healthy and the packet is dropped. At task box 5, the instance of the initial control packet is looped back through the loopback port to the source network element, thus the source network element may repetitively sends out the packet to the tunnel, so that the single initial control packet may trigger the packet recirculation and continuously monitor the tunnel.

Figure 4B:
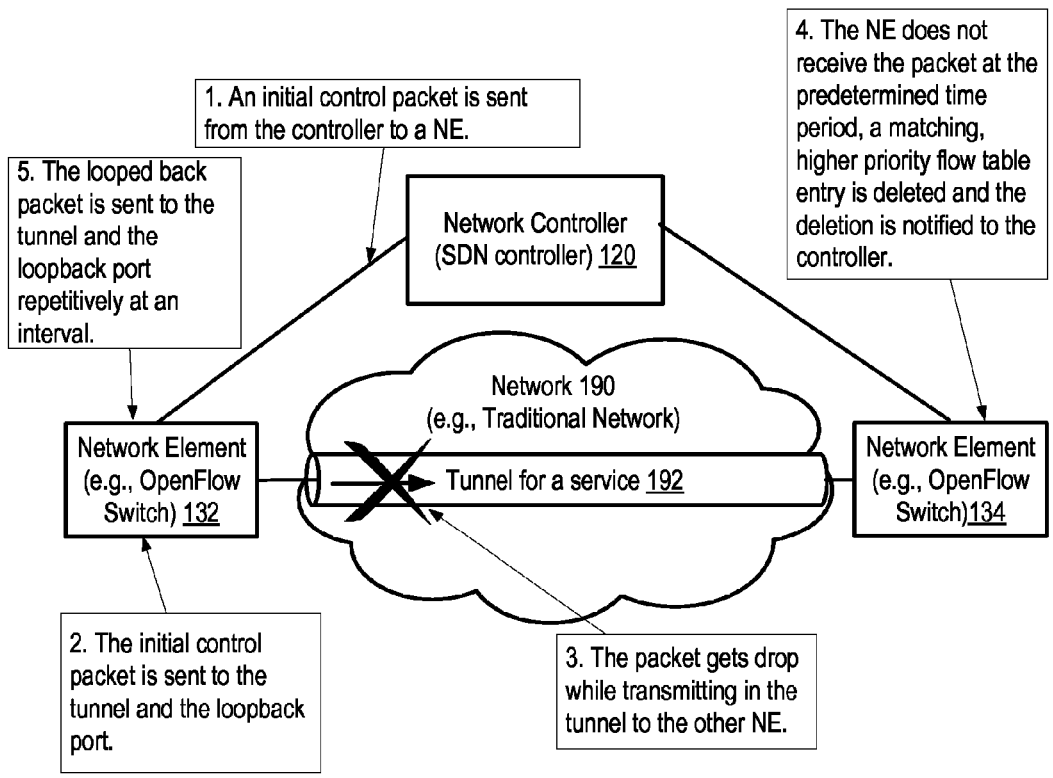
FIG. 4B illustrates unidirectional tunnel monitoring during path failure according to one embodiment of the invention.

FIG. 4B illustrates unidirectional tunnel monitoring during path failure according to one embodiment of the invention. FIG. 4B is similar to FIG. 4A, and the same or similar references indicate elements or components having the same or similar functionalities. Task boxes 1 to 5 illustrate the order in which operations are performed according to one embodiment of the invention.

Task boxes 1-2 and 5 in this figure perform the same operations as the corresponding ones in FIG. 4A. In task box 3 though, the packet gets dropped while transmitting in the tunnel to the destination network element 134. The drop of packet may be due to failure of the tunnel for a variety of reason, such as failure/congestion of a node (a network device) or a link that the tunnel passes through in the network 190. At task box 4, the destination network element 134 does not receive the packet at the predetermined time period, a matching, higher priority flow table entry is then deleted and the deletion is notified by the network controller 120. The notification of the deletion may cause the network controller 120 to perform mitigation measures on the tunnel, which may involve repair the failed node/link, reroute to avoid the congested node/link, so that the tunnel through the network 190 may restore to normal.

Figure 4C:
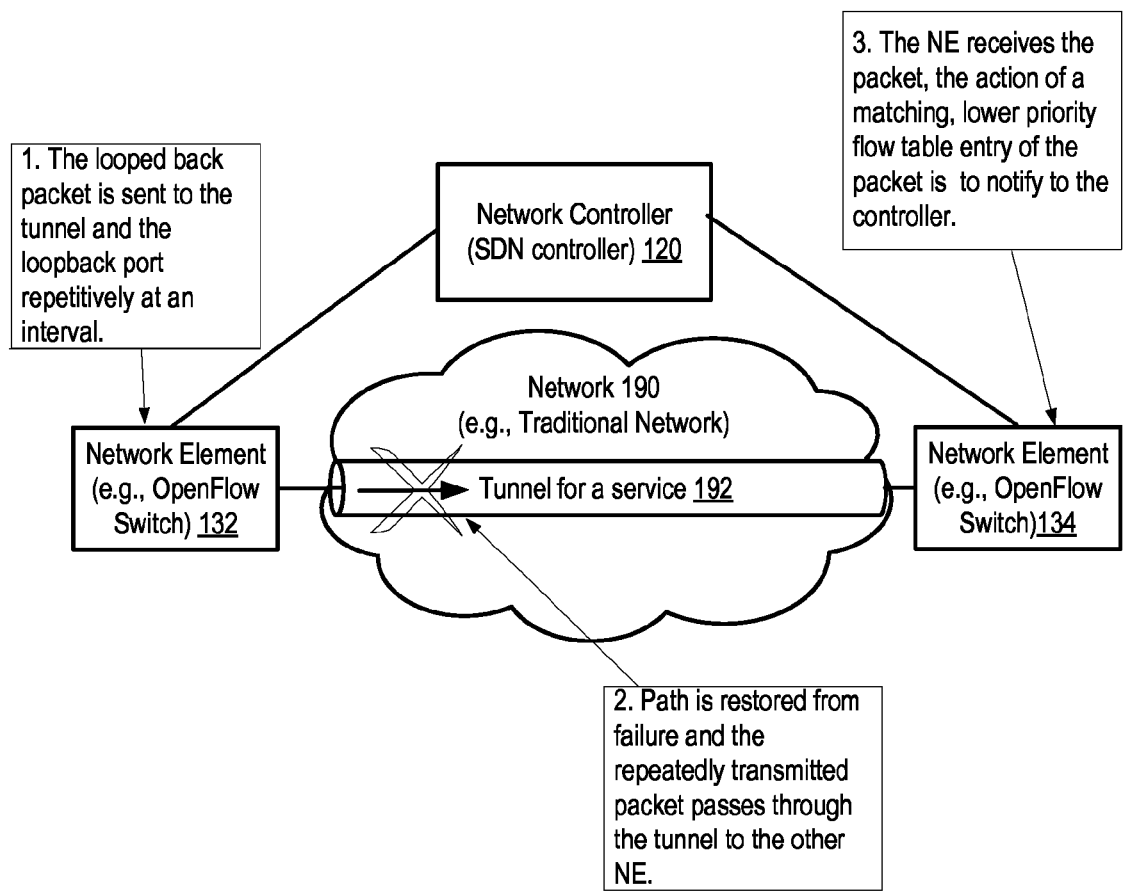
FIG. 4C illustrates unidirectional tunnel monitoring during path restoration according to one embodiment of the invention.

FIG. 4C illustrates unidirectional tunnel monitoring during path restoration according to one embodiment of the invention. FIG. 4C is similar to FIG. 4A, and the same or similar references indicate elements or components having the same or similar functionalities. Task boxes 1 to 4 illustrate the order in which operations are performed according to one embodiment of the invention. FIG. 4C follows FIG. 4B in one embodiment, and task box 5 in FIG. 4B is the same as task box 1 of FIG. 4C.

At task box 2, the path is restored from failure, i.e., the tunnel may pass through the repeatedly transmitted packet at closely spaced interval (e.g., 3.3 ms) to the destination network element 134. At task box 3, the received packet matches a flow table entry that is lower priority than the one deleted in FIG. 4B, but is not expired. The action associated with the flow table entry is to notify the network controller of the receipt of the packet, so that the network controller knows that the tunnel has been restored.

Flow Diagrams for Unidirectional Path Monitoring

As discussed herein above, the network controller (also referred to as SDN controller) is not responsible for path monitoring packet insertion and reception through packets sending to and from the network controller (e.g., through PACKET_IN and PACKET_OUT messages). Instead, the monitoring packets are processed through the network elements that the network controller manages. Thus, the network controller is decoupled from the high frequency repetitive data plane events occurring at the network elements. The network controller configures the network elements through directing the addition/removal of table entries in the forwarding tables and inserting the initial control packets, and the network elements proceed with processing the recirculated path monitoring packets autonomously when the path monitoring functions normally. When the path monitoring does not function normally, the network controller is notified and then involved in restoring the path monitoring functions.

Figure 5A:
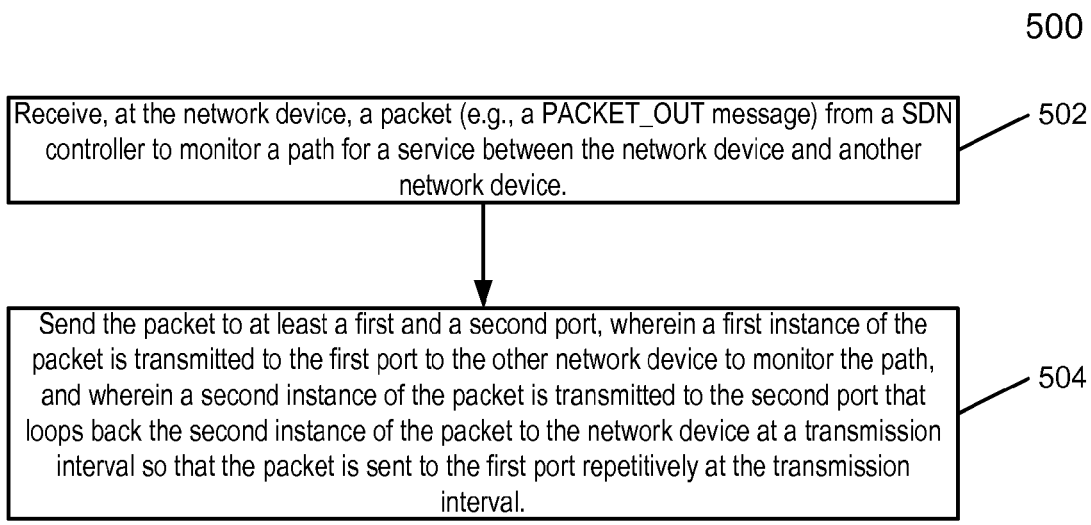
FIG. 5A is a flow diagram illustrating operations of a source network device implementing unidirectional path monitoring according to one embodiment of the invention.

FIG. 5A is a flow diagram illustrating operations of a source network device implementing unidirectional path monitoring according to one embodiment of the invention. Method 500 may be implemented in network element 132 or 134 of FIG. 1A according to one embodiment of the invention, where the network element may be implemented in a network device.

At reference 502, the network device receives a packet from a SDN controller to monitor a path for a service between the network device and another network device. The packet may be a PACKET_OUT message in compliance with the OpenFlow standard. The packet may specify the path to be monitored by identifying a DSCP bit for a tunnel sourced from the network device in the packet.

At reference 504, the network device sends packet to at least a first and a second port of the network device. A first instance of the packet is transmitted to the first port to the other network device to monitor the path, and a second instance of the packet is transmitted to the second port that loops back the second instance of the packet to the network device at a transmission interval so that the packet is sent to the first port repetitively at the transmission interval. The operations of the packet recirculation are discussed herein above in relation to FIG. 2.

Figure 5B:
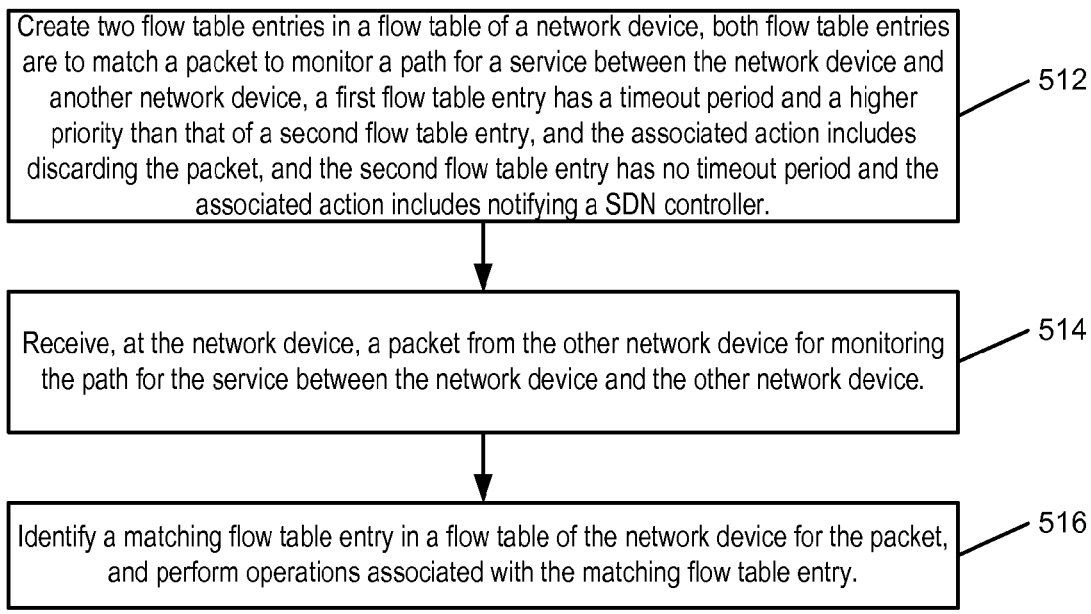
FIG. 5B is a flow diagram illustrating operations of a destination network device implementing unidirectional path monitoring according to one embodiment of the invention.

FIG. 5B is a flow diagram illustrating operations of a destination network device implementing unidirectional path monitoring according to one embodiment of the invention. Method 550 may be implemented in network element 132 or 134 of FIG. 1A according to one embodiment of the invention, where the network element may be implemented in a network device.

At reference 512, two flow table entries are created in a flow table of the network device. Both flow table entries are to match a packet to monitor a path for a service between this network device (a destination network device) and another network device (a source network device). A first flow table entry has a timeout period and a higher priority than that of a second table entry. The associated action of the first flow table entry includes discarding the packet, and the second flow table entry has no timeout period and the associated action is to notify a SDN controller.

At reference 514, the network device receives a packet from the other network device for monitoring the path for the service between the network device and the other network device. At reference 516, the network device identifies a matching flow table entry in a flow table of the network device for the packet, and perform operations associated with the matching flow table entry. As discussed herein above in relation to FIG. 3B and FIG. 4A-C, the matching flow table entry may be the higher priority or the lower priority flow table entry, and the network device may perform the associated operations accordingly.

Bidirectional Path Monitoring

FIG. 6A illustrates forwarding table implementation for bidirectional path monitoring at a source network element according to one embodiment of the invention. The source network element forwarding tables 662 includes a flow table 0 at reference 602, a flow table 1 at reference 604 and a group table at reference 312. The source network element may be the network element 132 or 134 of FIG. 1A.

The path to be monitored in this example is again a tunnel, which is an IP tunnel similar to the one discussed in relation to FIG. 3A. Different from the unidirectional path monitoring though, the forwarding tables in the source network element are supposed to receive the path monitoring packet returns from the destination network element. Thus, more operations are performed at the source network element according to the forwarding tables.

A packet arrives at the flow table 0, and the source network element determines where the packet is forwarded to. The source network element verifies that the packet is for path monitoring of a particular tunnel, for example, checking its DSCP bits (e.g., using DSCP bits as a match field, not shown in table 0); and if the packet is from the network controller (thus it's an initial control packet) or from the loopback port (thus it's a recirculated packet), the packet is forwarded to the group table as discussed in relation to FIG. 3A.

Additionally, if the packet is received from the tunnel port coupled to the destination network element of the tunnel, and it is for path monitoring of the particular tunnel, the packet is forwarded to the flow table 1 at reference 604. The flow table 1 includes two flow table entries, both matching to the same values of the matching fields, which matches the path monitoring packets. The table 1 at reference 604 is similar to the table 1 at reference 304 in FIG. 3B, and the same/similar features are not repeated here. One difference is that the failure detection interval may be the different, e.g., the higher priority flow table entry at reference 604 may be created relatively later than the one at reference 304 (e.g., 200 seconds instead of 100 seconds considering both the source and destination network elements need to be ready to process the path monitoring packet).

FIG. 6B illustrates forwarding table implementation for bidirectional path monitoring at a destination network element according to one embodiment of the invention. The destination network element implements one flow table 0 at reference 652. The match field matches path monitoring packets for the specific tunnel, similar to the match fields in the flow table 1 at reference 604 and the group table 612. Once a matching path monitoring packet is received, the corresponding action is to reflect back the packet to the tunnel port of the tunnel. The packet may be transmitted back to the specific tunnel at a different port (in which case the match field of table 1 at reference 604 needs to be updated to the different port, instead of the current UDP port 12345). Also, the destination network element may include additional information (e.g., metadata recording the status of the path from the source network element to the destination network element) prior to sending the path monitoring packet back to the tunnel.

Figure 7A:
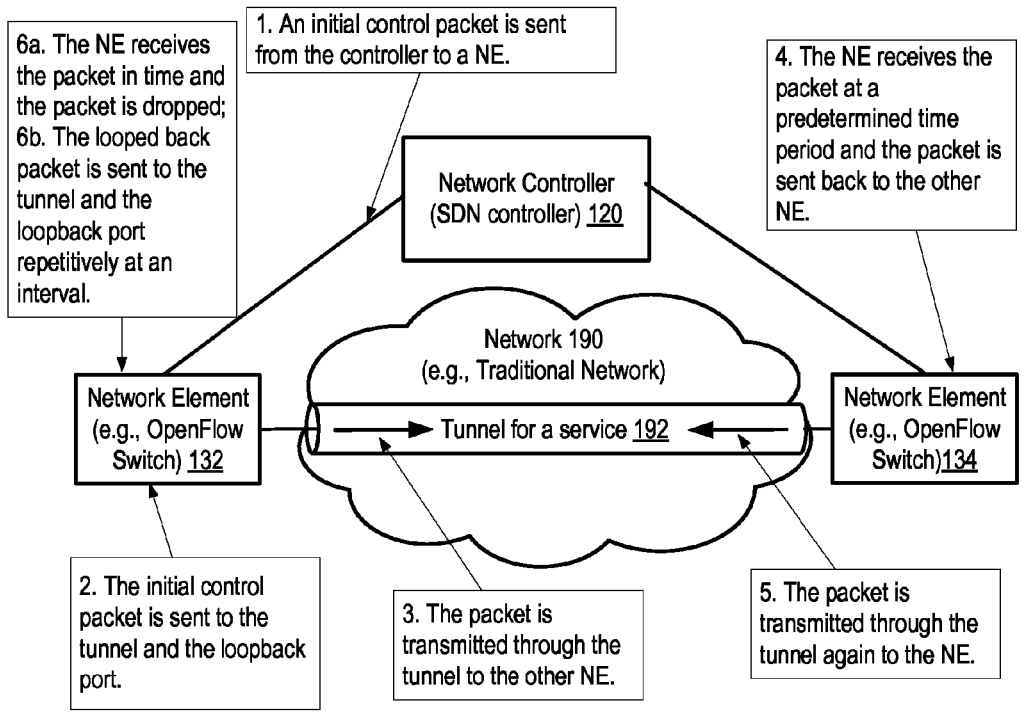
FIG. 7A illustrates bidirectional tunnel monitoring during normal operations according to one embodiment of the invention.

FIG. 7A illustrates bidirectional tunnel monitoring during normal operations according to one embodiment of the invention. FIG. 7A is similar to FIG. 4A, and the same or similar references indicate elements or components having the same or similar functionalities. Task boxes 1 to 6 illustrate the order in which operations are performed according to one embodiment of the invention.

Task boxes 1 to 3 in FIG. 7A are similar to task boxes 1 to 3 in FIG. 4A. At task box 4 though, when the packet is received in a predetermined time period (e.g., the failure detection interval), the packet is then returned to the tunnel. At task box 5, the packet is transmitted through the tunnel again to the source network element 132, at the opposite direction as the direction in task box 3. At task box 6a, the source network element receives the path monitoring packet in time (e.g., in the predetermined time period or a different time period) and the path monitoring packet is then dropped. At task box 6b, the instance of the initial control packet is looped back through the loopback port to the source network element, thus the source network element may repetitively sends out the packet to the tunnel, so that the single initial control packet may trigger the packet recirculation and continuously monitor the tunnel. Since operations in 6a and 6b may occur simultaneously and continuously, they are discussed together.

Figure 7B:
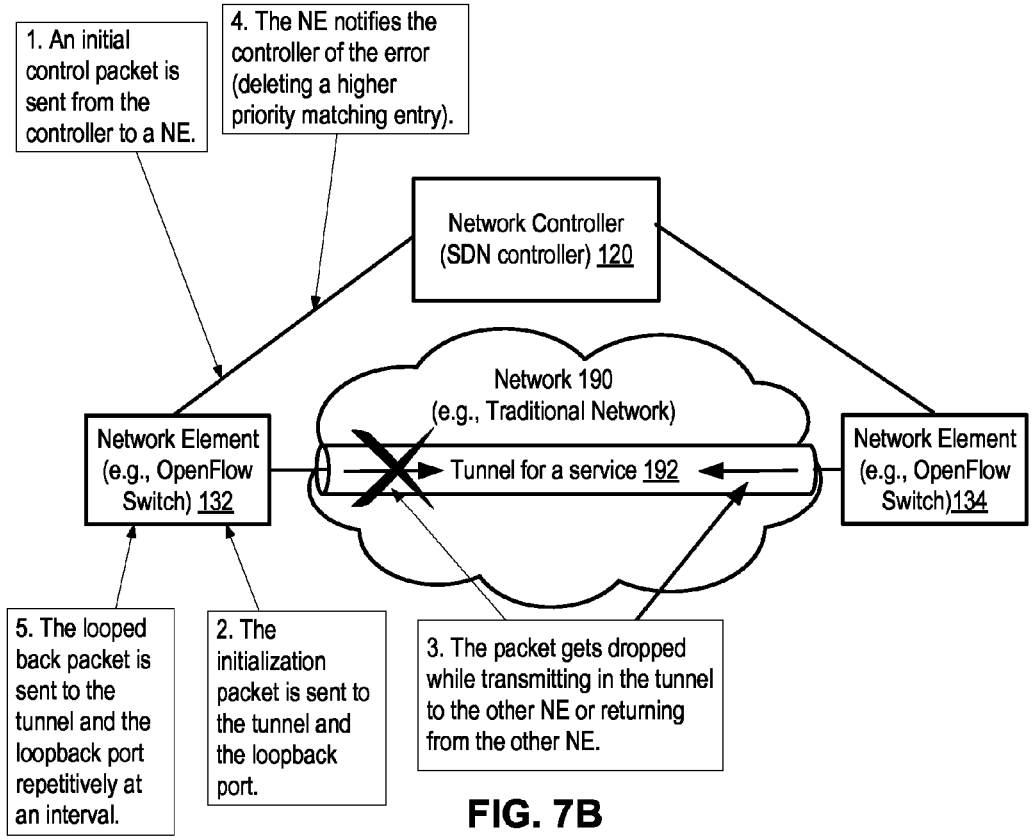
FIG. 7B illustrates bidirectional tunnel monitoring during path failure according to one embodiment of the invention.

FIG. 7B illustrates bidirectional tunnel monitoring during path failure according to one embodiment of the invention. FIG. 7B is similar to FIG. 7A, and the same or similar references indicate elements or components having the same or similar functionalities. Task boxes 1 to 5 illustrate the order in which operations are performed according to one embodiment of the invention.

Task boxes 1-2 and 5 in this figure perform the same operations as the task boxes 1-2, and 6b in FIG. 7A respectively. In task box 3 though, the packet gets dropped while transmitting in the tunnel to the destination network element 134 or from the destination network element 134 to the source network element 132. For the purpose of monitoring the tunnel's health bidirectionally, it matters little if the packet gets dropped at which direction, to the destination network element 134 or from the destination network element 134. Similarly, it matters little what operations the destination network element 134 perform. After the packet gets dropped, the source network element 132 deletes the higher priority flow table entry for the path monitoring of this tunnel when the timeout period (e.g., the failure detection interval) expires. The source network device 132 notifies the network controller 120 of the not-receiving-the-packet within the time out period (e.g., through the deletion notification) at task box 4. The network controller 120 then may perform mitigation operations.

Figure 7C:
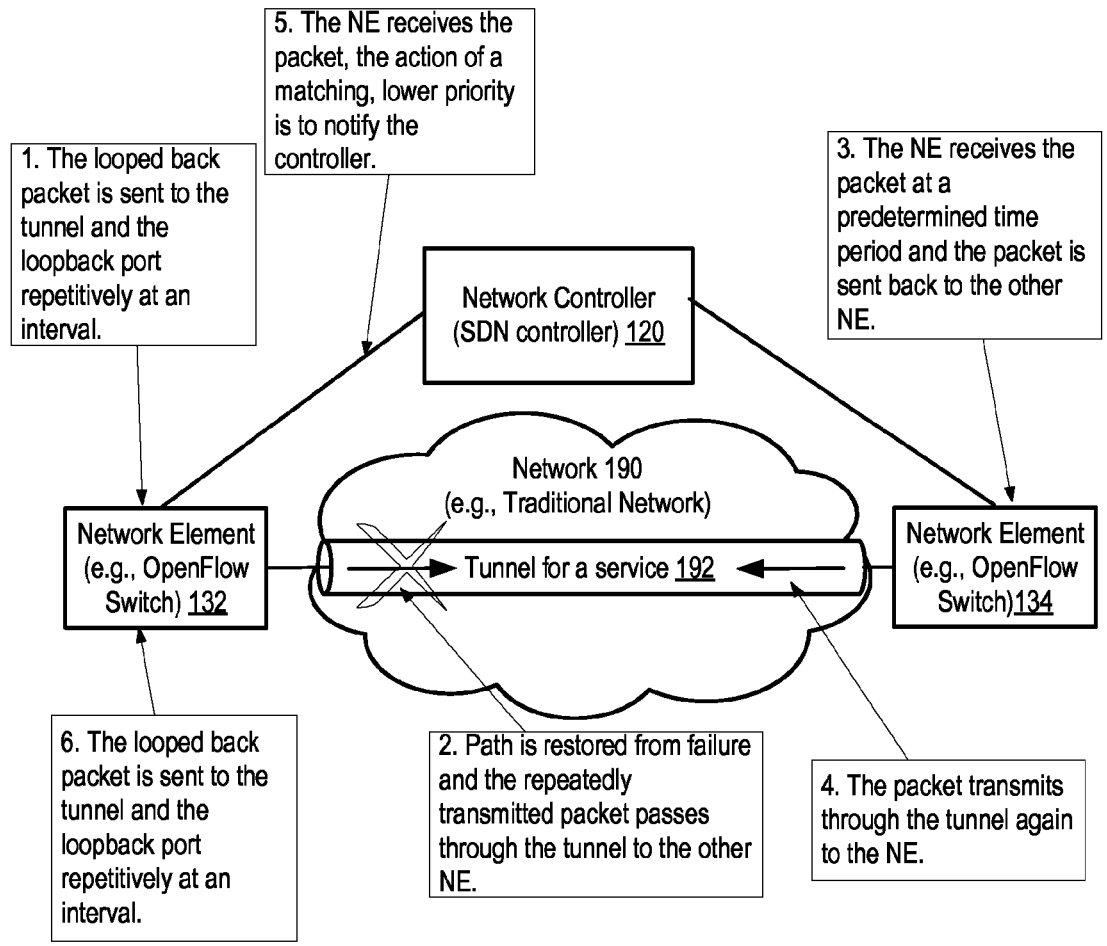
FIG. 7C illustrates bidirectional tunnel monitoring during path restoration according to one embodiment of the invention.

FIG. 7C illustrates bidirectional tunnel monitoring during path restoration according to one embodiment of the invention. FIG. 7C is similar to FIG. 7A, and the same or similar references indicate elements or components having the same or similar functionalities. Task boxes 1 to 6 illustrate the order in which operations are performed according to one embodiment of the invention. FIG. 7C follows FIG. 7B in one embodiment, and task box 5 in FIG. 7B is the same as task box 1 of FIG. 7C.

At task box 2, the path is restored from failure, i.e., the tunnel may pass through the repeatedly transmitted packet at closely spaced interval (e.g., 3.3 ms) to the destination network element 134. At task boxes 3 and 4, the destination network element 134 performs the same operations as discussed in relation to task boxes 4 and 5 of FIG. 7A respectively. At task box 5, the source network element matches the received packet with a flow table entry that is lower priority than the one deleted in FIG. 7B, but is not expired. The action associated with the flow table entry is to notify the network controller of the receipt of the packet, so that the network controller knows that the tunnel has been restored.

Flow Diagram for Bidirectional Path Monitoring

Figure 8:
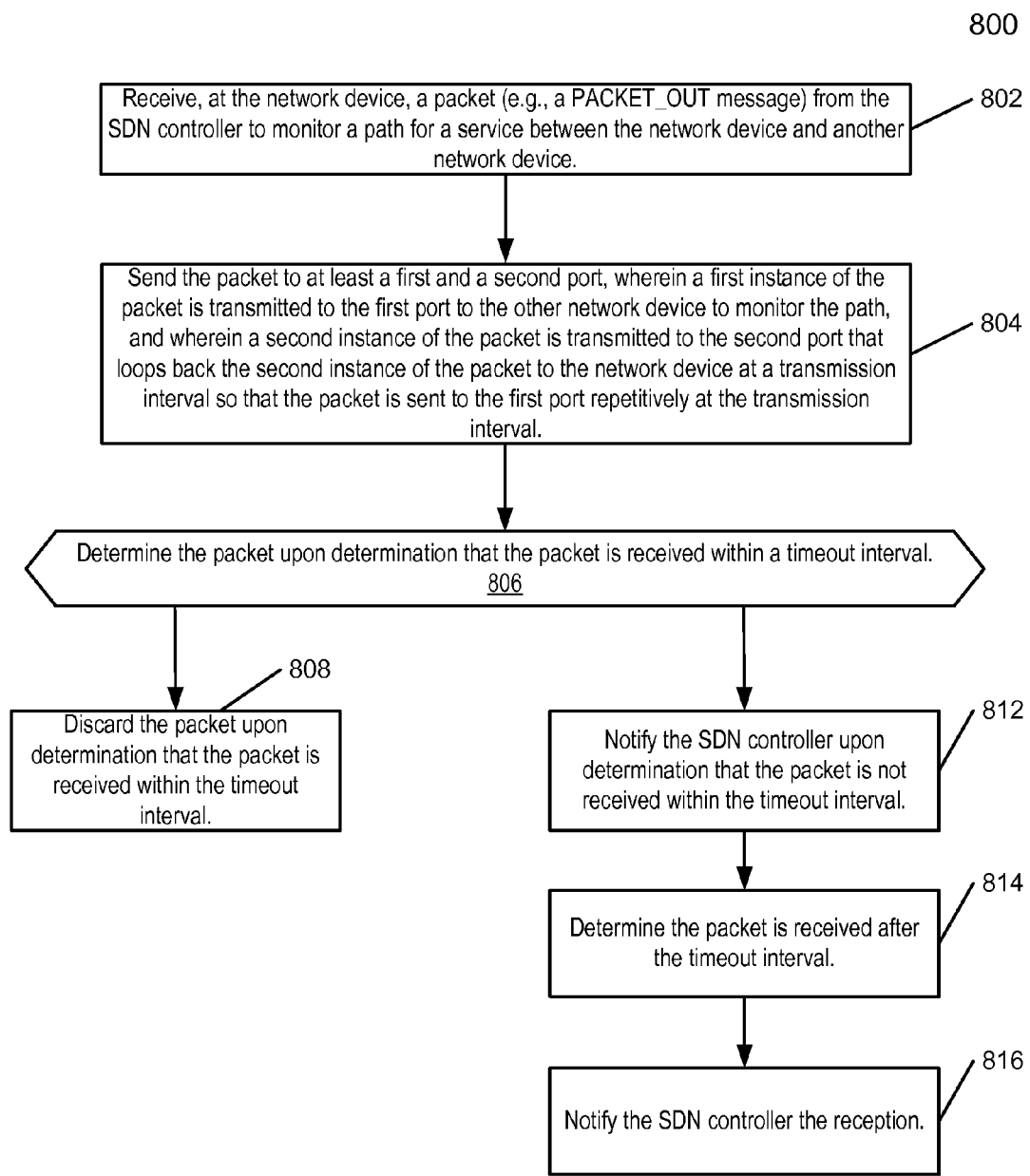
FIG. 8 is a flow diagram illustrating operations of a source network device implementing bidirectional path monitoring according to one embodiment of the invention.

The operations of the bidirectional path monitoring are similar to the ones in the unidirectional path monitoring, but the allocation of tasks between the source and destination network elements is different. FIG. 8 is a flow diagram illustrating operations of a source network device implementing bidirectional path monitoring according to one embodiment of the invention. Method 800 may be implemented in network element 132 or 134 of FIG. 1A according to one embodiment of the invention, where the network element may be implemented in a network device.

At reference 802, the network device receives a packet from a SDN controller to monitor a path for a service between the network device and another network device. The packet may be a PACKET_OUT message in compliance with the OpenFlow standard. The packet may specify the path to be monitored by identifying a DSCP bit for a tunnel sourced from the network device in the packet.

At reference 804, the network device sends packet to at least a first and a second port of the network device. A first instance of the packet is transmitted to the first port to the other network device to monitor the path, and a second instance of the packet is transmitted to the second port that loops back the second instance of the packet to the network device at a transmission interval so that the packet is sent to the first port repetitively at the transmission interval. The operations of the packet recirculation are discussed herein above in relation to FIG. 2.

At reference 806, the network device determines if the packet is received within a timeout interval at the network device. The timeout interval may be determined based on time delay of the path and processing time of the packet at the other network device. The timeout interval may be different between the first received packet and subsequently received same packets for monitoring the same path, as the processing delay and processing delay may cause the first received packet takes long time to arrive but the subsequent packets will be arrived at the same pace (e.g., the first received packet arrives 200 seconds after the SDN controller sends out the packet for path monitoring, but the subsequent packets arrives continuously at a 3.3 ms interval).

If the packet is received within the timeout interval, the packet is discarded at reference 808. Since the packets are recirculated through the loopback ports and then transmitted through the monitored path bidirectionally, the packet will be received continuously at the network device and it indicates that the monitored path works properly.

If the packet is not received within the timeout interval, the network device notifies the SDN controller of the failure at reference 812. In one embodiment, the failure is notified to the SDN controller by the expiration of a matching, higher priority flow table entry for monitoring the path, as the expiration of the flow table entry triggers a flow table entry removal notification to the SDN controller. The failure of receiving the packet may be cause by the failure of the monitored path as discussed herein above. The notification may trigger the SDN controller and/or the network devices take mitigation operations to restore the monitored path.

Then at reference 814, the network device determines that the packet is received after the timeout interval. The packet may be received again due to restoration of the monitored path. At reference 816, the network device notifies the SDN controller of the reception of the packet. In one embodiment, the notification is based on a matching, lower priority flow table entry for monitoring the path, where the lower priority flow table entry does not expire like the higher priority flow table entry. Once the lower priority flow table entry matches the received packet, the corresponding action of the flow table entry is to notify the SDN controller.

As discussed herein above, both the unidirectional and bidirectional path monitoring may use existing standard structures for SDN forwarding tables and messages in compliance with SDN standards such as the OpenFlow standards. Thus, the path monitoring can be implemented in all the network elements in compliance with the standard of OpenFlow switches.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920, including the path monitoring module (PMM) 142 as discussed herein above, which is a software module configured on special—purpose network device 902 for coordinating path monitoring functions. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the path monitoring module 142 may be executed by the networking hardware 910 to instantiate a PMM instance (PI) 921A, which perform methods discussed herein above such as methods 500, 550 and 800. PI 921A and that part of the networking hardware 910 that executes that instance (be it hardware dedicated to that networking software instance and/or time slices of hardware temporally shared by that networking software instance with others of the networking software instance 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950, which may also contain the PMM 142. During operation, the processor(s) 942 execute the software 950 to instantiate one or more sets of one or more applications 964A-R. While one embodiment does not implement virtualization, alternative embodiments may use different forms of virtualization—represented by a virtualization layer 954 and software containers 962A-R. For example, one such alternative embodiment implements operating system-level virtualization, in which case the virtualization layer 954 represents the kernel of an operating system (or a shim executing on a base operating system) that allows for the creation of multiple software containers 962A-R that may each be used to execute one of the sets of applications 964A-R. In this embodiment, the multiple software containers 962A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 954 represents a hypervisor (sometimes referred to as a virtual machine monitor (VMM)) or a hypervisor executing on top of a host operating system; and 2) the software containers 962A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 964A-R, as well as the virtualization layer 954 and software containers 962A-R if implemented, are collectively referred to as software instance(s) 952. Each set of applications 964A-R, corresponding software container 962A-R if implemented, and that part of the hardware 940 that executes them (be it hardware dedicated to that execution and/or time slices of hardware temporally shared by software containers 962A-R), forms a separate virtual network element(s) 960A-R.

The virtual network element(s) 960A-R perform similar functionality to the virtual network element(s) 930A-R— e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 962A-R differently. For example, while embodiments of the invention are illustrated with each software container 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 962A-R to VNEs also apply to embodiments where such a finer level of granularity is used.

In certain embodiments, the virtualization layer 954 includes a virtual switch that provides similar forwarding services as a physical Ethernet switch. Specifically, this virtual switch forwards traffic between software containers 962A-R and the NIC(s) 944, as well as optionally between the software containers 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 9C:
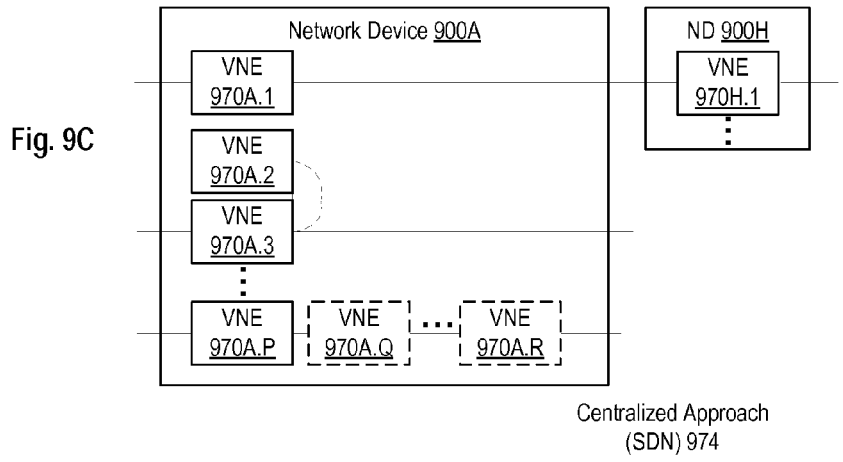
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the virtual machines 962A-R may operate as servers; the same would be true for the hybrid network device 906; in the case of the special-purpose network device 902, one or more such servers could also be run on a hypervisor executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
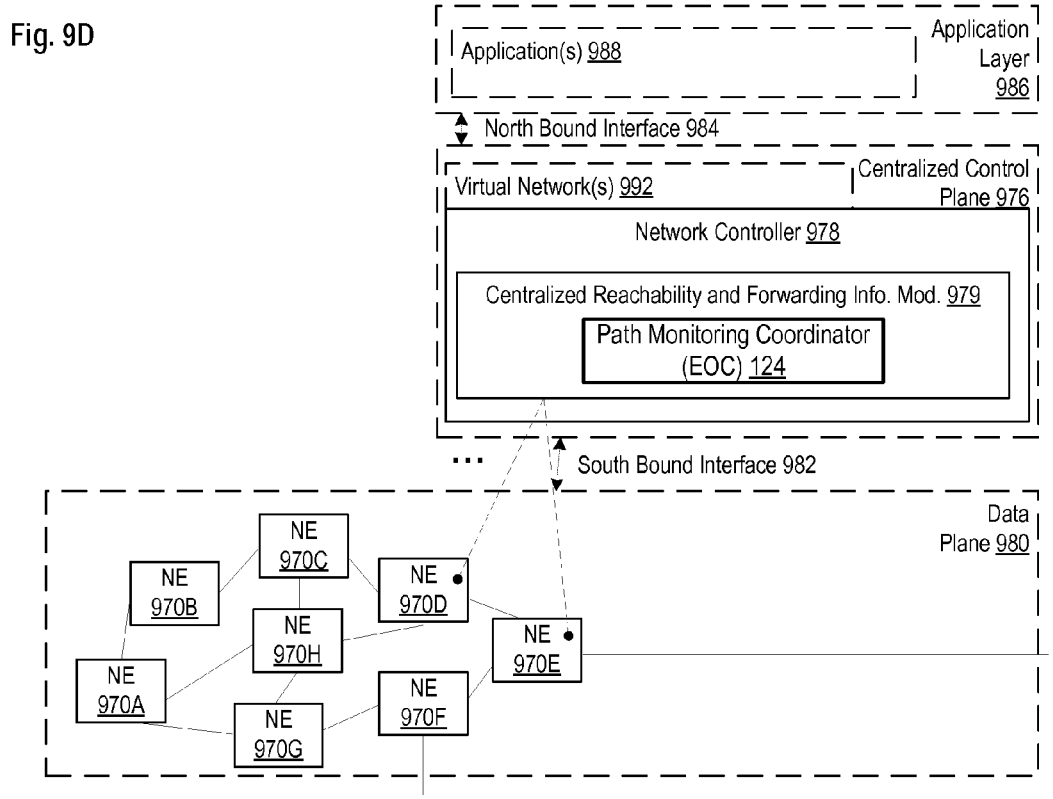
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A. Specifically, FIG. 9D illustrates network elements (NEs) 970A-H with the same connectivity as the NDs 900A-H of FIG. 9A with a centralized approach for maintaining reachability and forwarding information (also called network control), according to some embodiments of the invention.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). The centralized reachability and forwarding information module 979 contains the path monitoring coordinator 124 as illustrated in FIG. 1A.

The network intelligence is centralized in the centralized control plane 976 executing on electronic devices that are typically separate from the NDs. For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
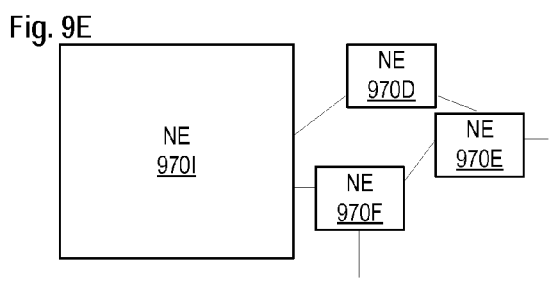
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
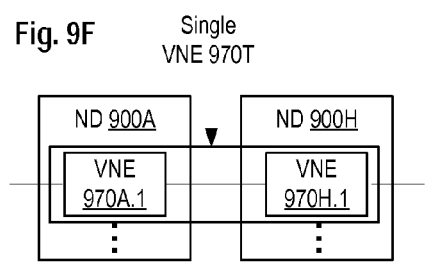
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 970I in one of the virtual network(s) 992 of FIG. 9D, according to some embodiments of the invention. FIG. 9E shows that in this virtual network, the NE 970I is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagrams FIGS. 5A-B and FIG. 8 are described with reference to the exemplary embodiment of FIGS. 1A-B and 9A-F. However, it should be understood that the operations of flow diagrams can be performed by embodiments of the invention other than those discussed with reference to the exemplary embodiment of FIGS. 1A-B and 9A-F, and the exemplary embodiment of FIGS. 1A-B and 9A-F can perform operations different than those discussed with reference to the flow diagrams of FIGS. 5A-B and FIG. 8.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network device coupled to a software-defined networking (SDN) system, wherein the SDN system contains a set of network devices and a SDN controller managing the set of network devices, the method comprising:
   receiving, at the network device, a packet from the SDN controller to monitor a path for a service between the network device and another network device;
   sending the packet to at least a first and a second port, wherein a first instance of the packet is transmitted to the first port to the other network device to monitor the path, and wherein a second instance of the packet is transmitted to the second port that loops back the second instance of the packet to the network device at a transmission interval so that the packet is sent to the first port repetitively at the transmission interval;
   determining whether the packet is received by the network device from the other network device within a timeout interval; and
   discarding the packet upon determination that the packet is received by the network device within the timeout interval.

2. The method of claim 1, wherein the path is a tunnel for the service identified by a differentiated services code point (DSCP) value in the packet.

3. The method of claim 1, wherein the second port is physically wired to loop back to the network device.

4. The method of claim 1, wherein sending the packet to the first and second ports is based on a group table entry of the network device, wherein the group table entry includes instructions to transmit the packet to the first and the second ports.

5. The method of claim 1, wherein the timeout interval is determined based on time delay of the path and processing time of the packet at the other network device.

6. The method of claim 1, further comprising:
   notifying the SDN controller upon determination that the packet is not received within the timeout interval.

7. The method of claim 1, wherein the discarding the packet is based on a first flow table entry matching the packet, and wherein the first flow table entry expires after the timeout interval.

8. The method of claim 7, further comprising:
   determining the packet is received after the timeout interval; and
   notifying the SDN controller of the packet being received after the timeout interval.

9. The method of claim 8, wherein notifying the SDN controller of the packet being received after the timeout interval is based on a second flow table entry matching the packet, wherein the first flow table entry has a higher priority than the second flow table entry.

10. The method of claim 1, wherein the network device is in compliance with OpenFlow standards, and wherein the packet received from the SDN controller is a PACKET_OUT message.

11. A network device coupled to a software-defined networking (SDN) system, wherein the SDN system contains a plurality of network devices and a SDN controller managing the plurality of network devices, the network device comprising:
   a processor and a memory coupled to the processor, the memory containing instructions executable by the processor, wherein the network device is operative to:
   receive a packet from the SDN controller to monitor a path for a service between the network device and another network device,
   send the packet to at least a first and a second port, wherein a first instance of the packet is transmitted to the first port to the other network device to monitor the path, and wherein a second instance of the packet is transmitted to the second port that loops back the second instance of the packet to the network device at a transmission interval so that the packet is sent to the first port repetitively at the transmission interval,
   determine whether the packet is received by the network device from the other network device within a timeout interval, and
   discard the packet upon determination that the packet is received by the network device within the timeout interval.

12. The network device of claim 11, wherein the network device is further operative to:
  notify the SDN controller upon determination that the packet is not received within the timeout interval.

13. The network device of claim 11, wherein the discarding of the packet is to be based on a first flow table entry matching the packet, and wherein the first flow table entry expires after the timeout interval.

14. The network device of claim 13, wherein the network device is further operative to:
  determine the packet is received after the timeout interval; and
  notify the SDN controller of the packet being received after the timeout interval.

15. The network device of claim 14, wherein notification to the SDN controller of the packet being received after the timeout interval is to be based on a second flow table entry matching the packet, wherein the first flow table entry has a higher priority than the second flow table entry.

16. A non-transitory machine-readable storage medium having instructions stored therein, which when executed by a processor, cause the processor to perform operations in a network device coupled to a software-defined networking (SDN) system, wherein the SDN system contains a set of network devices and a SDN controller managing the set of network devices, the operations comprising:
  receiving, at the network device, a packet from the SDN controller to monitor a path for a service between the network device and another network device;
  sending the packet to at least a first and a second port, wherein a first instance of the packet is transmitted to the first port to the other network device to monitor the path, and wherein a second instance of the packet is transmitted to the second port that loops back the second instance of the packet to the network device at a transmission interval so that the packet is sent to the first port repetitively at the transmission interval;
  determining whether the packet is received by the network device from the other network device within a timeout interval; and
  discarding the packet upon determination that the packet is received by the network device within the timeout interval.

17. The non-transitory machine-readable storage medium of claim 16, the operations further comprise:
  notifying the SDN controller upon determination that the packet is not received within the timeout interval.

18. The non-transitory machine-readable storage medium of claim 16, wherein the discarding the packet is based on a first flow table entry matching the packet, and wherein the first flow table entry expires after the timeout interval.

19. The non-transitory machine-readable storage medium of claim 18, the operations further comprise:
  determining the packet is received after the timeout interval; and
  notifying the SDN controller of the packet being received after the timeout interval.

20. The non-transitory machine-readable storage medium of claim 19, wherein notifying the SDN controller of the packet being received after the timeout interval is based on a second flow table entry matching the packet, wherein the first flow table entry has a higher priority than the second flow table entry.

* * * * *